(12) United States Patent
Chen

(10) Patent No.: US 7,062,593 B2
(45) Date of Patent: Jun. 13, 2006

(54) CIRCUIT SYSTEM AND METHOD FOR DATA TRANSMISSION BETWEEN LPC DEVICES

(75) Inventor: Lin-Hung Chen, Taipei (TW)

(73) Assignee: Via Technologies, Inc.

( * ) Notice: Subject to any disclaimer, the term of this patent is extended or adjusted under 35 U.S.C. 154(b) by 230 days.

(21) Appl. No.: 10/098,550

(22) Filed: Mar. 18, 2002

(65) Prior Publication Data

US 2003/0097515 A1    May 22, 2003

(30) Foreign Application Priority Data

Nov. 16, 2001   (TW) .............................. 90128390 A

(51) Int. Cl.
*G06F 13/36* (2006.01)

(52) U.S. Cl. ...................... 710/314; 305/306; 305/100; 305/3

(58) Field of Classification Search ................ 710/314, 710/313, 119, 305, 306, 100, 3
See application file for complete search history.

(56) References Cited

U.S. PATENT DOCUMENTS

| | | | | |
|---|---|---|---|---|
| 6,119,189 | A * | 9/2000 | Gafken et al. ............... | 710/110 |
| 6,157,970 | A * | 12/2000 | Gafken et al. ................ | 710/27 |
| 6,327,636 | B1 * | 12/2001 | Guthrie et al. .............. | 710/119 |
| 6,654,349 | B1 * | 11/2003 | Lee ............................. | 370/252 |
| 6,701,403 | B1 * | 3/2004 | Lary et al. ................... | 710/305 |
| 6,732,216 | B1 * | 5/2004 | Shaw ........................... | 710/305 |
| 2002/0103005 | A1 * | 8/2002 | Watts et al. ................. | 455/556 |
| 2002/0144037 | A1 * | 10/2002 | Bennett et al. ............. | 710/105 |
| 2003/0037198 | A1 * | 2/2003 | Hunsaker ..................... | 710/313 |
| 2003/0078984 | A1 * | 4/2003 | Wu et al. .................... | 709/208 |
| 2003/0093607 | A1 * | 5/2003 | Main et al. ................. | 710/306 |
| 2003/0188077 | A1 * | 10/2003 | Watts et al. ................ | 710/313 |

OTHER PUBLICATIONS

Flexible CPLD for low pin-count aplications, Ed Barnett, ICT Inc, ISBN# 0-7803-2636-9.*
A RISC Processor for Embedded Applications within an ASIC, Charles Roberts, VLSI Technology, Inc. 1991 IEEE.*

* cited by examiner

Primary Examiner—Rehana Perveen
Assistant Examiner—Kim T. Huynh
(74) Attorney, Agent, or Firm—Rosenberg, Klein & Lee

(57) ABSTRACT

The present invention provides a circuit system for data transmission between LPC devices, comprising: a first LPC bus, connected to a first LPC device; a second LPC bus, connected to a second LPC device; and an LPC host controller, able to drive the first LPC device through the first LPC bus and the second LPC device through the second LPC bus; wherein the LPC host controller further comprises an address register. The present invention further provides a method for data transmission between LPC devices, comprising the steps of: starting a first cycle through a first LPC bus by an LPC host controller, wherein a first LPC device sends a request to have a transaction with a second LPC device, and inserting a plurality of wait states after the request is received by the LPC host controller; and starting a second cycle through a second LPC bus by the LPC host controller, wherein the LPC host controller has a transaction with the second LPC device according to the request from the first LPC device.

13 Claims, 7 Drawing Sheets

CIRCUIT SYSTEM AND METHOD FOR DATA TRANSMISSION BETWEEN LPC DEVICES

BACKGROUND OF THE INVENTION

1. Field of the Invention

The present invention generally relates to a Low Pin Count (to be abbreviated as LPC hereinafter) device and a method thereof, and more particularly, to a circuit system and a method for data transmission between LPC devices, in which there is an address register installed either in an LPC host controller connected to each LPC device through a respective LPC bus or in each LPC device so that the LPC devices can communicate according to the LPC interface specification.

2. Description of the Prior Art

With the rapid development in the information industry, people have increasing needs for a higher operation speed as well as a higher data transmission rate of information products. The conventional ISA (Industry Standard Architecture) interface is too slow to support the data flow according to the modem electronics products. More particularly, the ISA interface works under the clock frequency of 8 MHz and the number of required pins is 60, which may occupy lots of space and increase the fabrication cost of the socket. Therefore, a new Low Pin Count (LPC) interface is proposed to work under the clock frequency of 33 MHz, which leads to a much higher transmission efficiency, and require only less than 10 pins, which significantly reduce the fabrication cost of the socket. Hence, the LPC interface has received considerable attention.

The circuit system diagram of a conventional LPC circuit system is as shown in FIG. 1, which comprises: an LPC host controller 12, a master LPC device 14, and a slave LPC device 16, wherein the master LPC device 14 and the slave LPC device 16 are connected to the LPC host controller 12 through an LPC bus 18.

According to the LPC interface specification, every cycle of transaction is started and ended by the LPC host controller. Therefore, in the circuit system described above, data transmission is only performed either between the LPC host controller 12 and the master LPC device 14 or between the LPC host controller 12 and the slave LPC device 16, as shown in FIG. 2A and FIG. 2B. FIG. 2A shows the typical timing diagram for the read cycles of the master device, in which LFRAME# is one control line used by the host controller to indicate the start of cycles and the termination of cycles due to an abort or time-out condition. At the beginning of a read cycle, LFRAME# is only normally active at the start of a cycle and the LPC host controller (H) drives a START value on LAD[3:0]. Later, the active device is turned around (TAR) to become the master LPC device (M), which then determines the cycle type and the direction (CYCTYPE+DIR) as a read cycle. Then the address (ADDR) and the size (SIZE) of the data are determined. Later, the active device is turned around (TAR) again to become the LPC host controller (H), which drives a SYNC signal, and responds the data according to the read request of the master LPC device, and then terminate the cycle by an action of turning-around.

FIG. 2B shows the typical timing diagram for the write cycles of the slave device. At the beginning of a write cycle, the LPC host controller (H) drives a START value on LAD[3:0] and then determines the cycle type and the direction (CYCTYPE+DIR) as a write cycle, and further transmits the target address (ADDR) and the data to be written (DATA). Later, the active device is turned around (TAR) to become the slave LPC device (S), which drives a SYNC signal, and writes the data to the address according to the request of the LPC host controller. Finally, turn the bus around to the LPC host controller and terminate the cycle (TAR).

Accordingly, there is no transaction between the master LPC device 14 and the slave LPC device 16. It is a waste of resources that there is no data transmission between devices in the same system. Therefore, there is need in providing a circuit system and method for data transmission between LPC devices so as to simplify the transmission process and increase the transmission efficiency.

SUMMARY OF THE INVENTION

Accordingly, it is the primary object of the present invention to provide a circuit system for data transmission between LPC devices, in which there is an LPC host controller connected to each LPC device through a respective LPC bus so that the LPC devices can communicate according to the LPC interface specification.

It is another object of the present invention to provide a circuit system and method for data transmission between LPC devices, in which there is an address register installed in an LPC host controller so that the address of the data to be transmitted is recorded so as to identify the correct data and the transmission direction.

It is still another object of the present invention to provide a circuit system and a method for data transmission between LPC devices, in which there is an address register install in each of the host controller and the LPC devices so that the address of the data to be transmitted is recorded so as to identify the correct data and the transmission direction when only one LPC bus is employed.

It is still another object of the present invention to provide a circuit system and a method for data transmission between LPC devices, in which data transmission between LPC devices is completed within two cycles.

In order to achieve the foregoing objects, the present invention provides a circuit system for data transmission between LPC devices, comprising: a first LPC bus, connected to a first LPC device; a second LPC bus, connected to a second LPC device; and an LPC host controller, able to drive the first LPC device through the first LPC bus and the second LPC device through the second LPC bus; wherein the LPC host controller further comprises an address register.

The present invention further provides a method for data transmission between LPC devices, comprising the steps of: starting a first cycle through a first LPC bus by an LPC host controller, wherein a first LPC device sends a request to have a transaction with a second LPC device, and inserting a plurality of wait states after the request is received by the LPC host controller; and starting a second cycle through a second LPC bus by the LPC host controller, wherein the LPC host controller has a transaction with the second LPC device according to the request from the first LPC device.

Other and further features, advantages and benefits of the invention will become apparent in the following description taken in conjunction with the following drawings. It is to be understood that the foregoing general description and following detailed description are exemplary and explanatory but are not to be restrictive of the invention. The accompanying drawings are incorporated in and constitute a part of this application and, together with the description, serve to explain the principles of the invention in general terms. Like numerals refer to like parts throughout the disclosure.

BRIEF DESCRIPTION OF THE DRAWINGS

The objects, spirits and advantages of the preferred embodiments of the present invention will be readily understood by the accompanying drawings and detailed descriptions, wherein.

DETAILED DESCRIPTION OF THE INVENTION

The present invention providing a circuit system and a method for data transmission between LPC devices can be exemplified by the preferred embodiments as described hereinafter.

Figure 1:
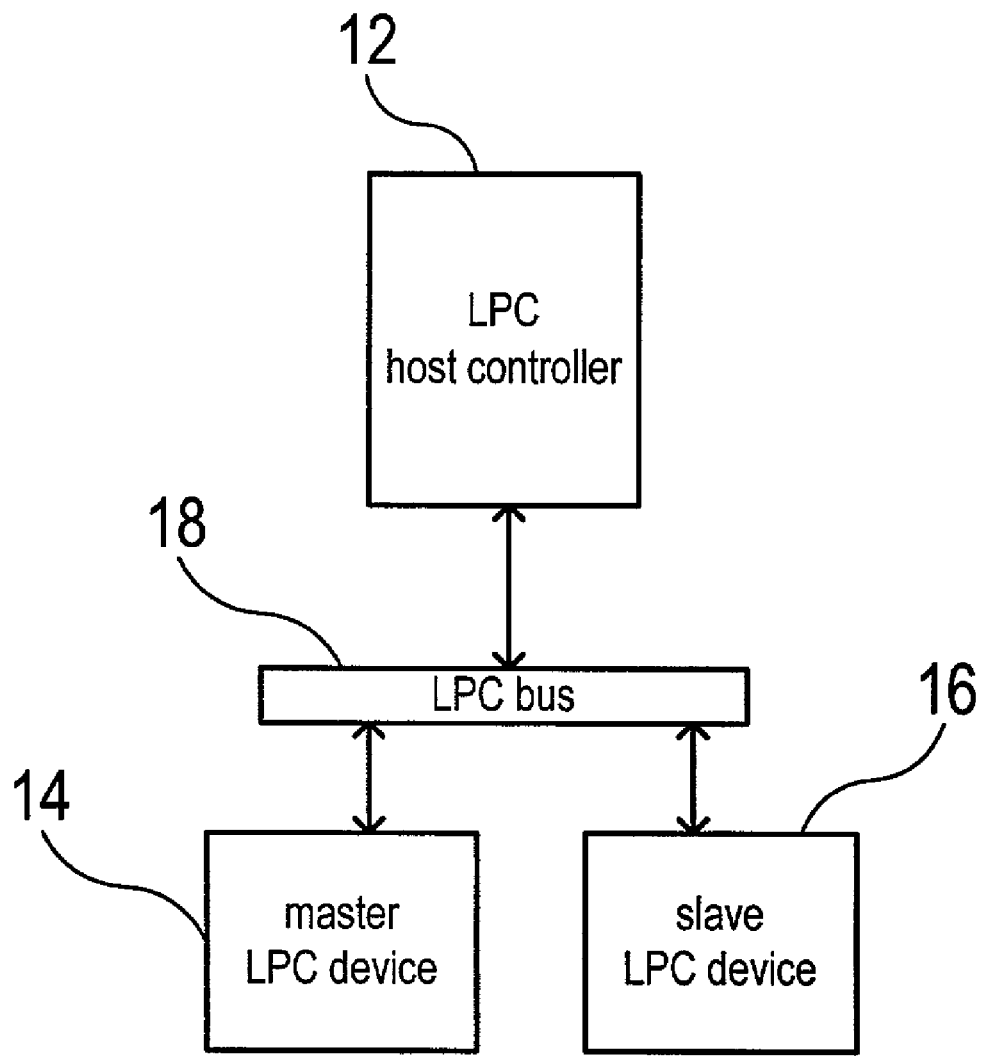
FIG. 1 is a block circuit system diagram showing the LPC circuit system in accordance with the prior art.
Figure 2A:
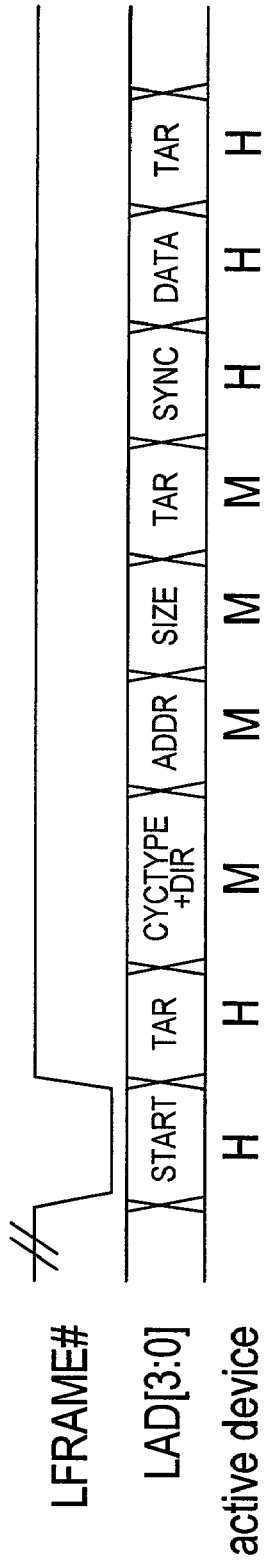
FIG. 2A and FIG. 2B show the typical timing diagrams for the read cycle of the master device and the write cycle of the slave device, respectively, in accordance with the prior art.
Figure 2B:
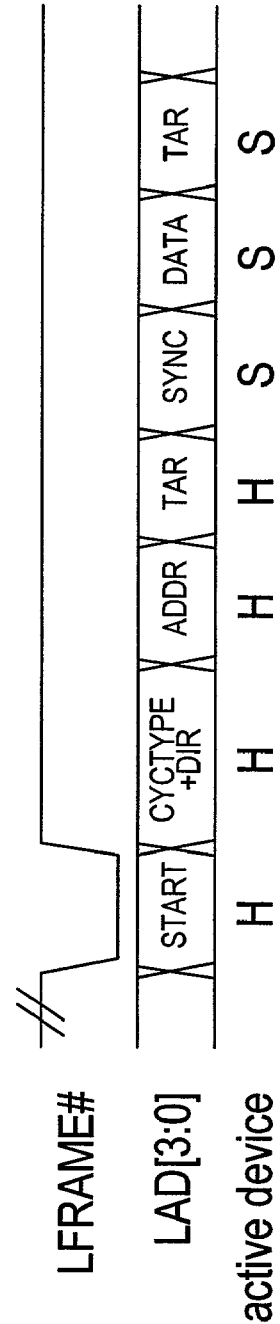
Figure 3:
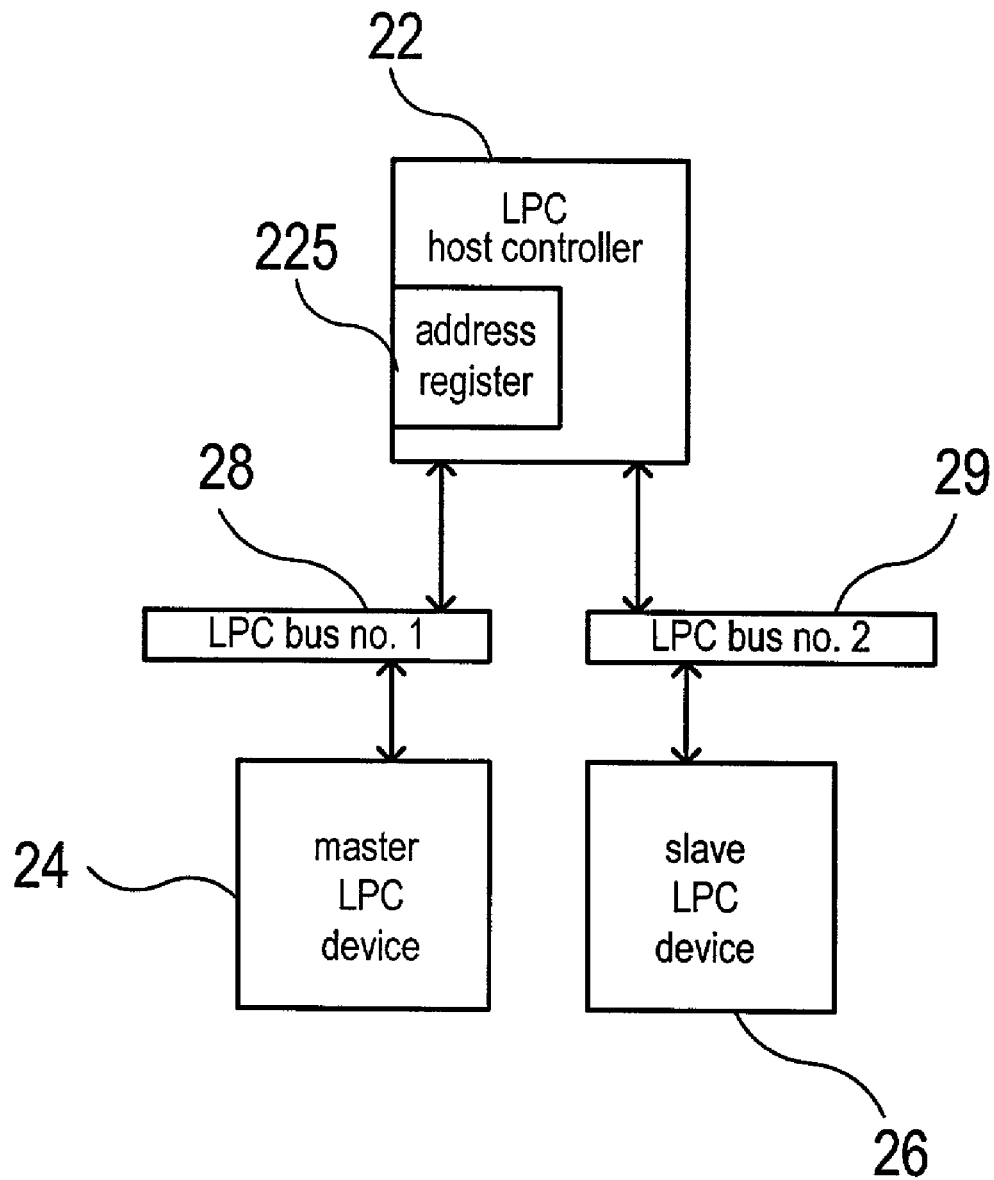
FIG. 3 is a block circuit system diagram showing the LPC circuit system in accordance with one embodiment of the present invention.

To start with, please refer to FIG. 3, which is a block circuit system diagram showing the LPC circuit system in accordance with one embodiment of the present invention. As shown in the figure, the circuit system configuration comprises: a first LPC bus 28, connected to a master LPC device 24; a second LPC bus 29, connected to a slave LPC device 26; and an LPC host controller 22, able to drive the master LPC device 24 through the first LPC bus 28 and the slave LPC device 26 through the second LPC bus 29; wherein the LPC host controller 22 further comprises an address register 225.

According to the LPC interface specification, each read/write cycle is started at the LPC host controller 22 and then is ended at the LPC host controller 22. Therefore, data transmission cannot be performed between LPC devices. In the circuit system disclosed in the present invention, a plurality if LPC buses connected to the respective LPC devices are employed to make data transmission between LPC devices possible.

Figure 4:
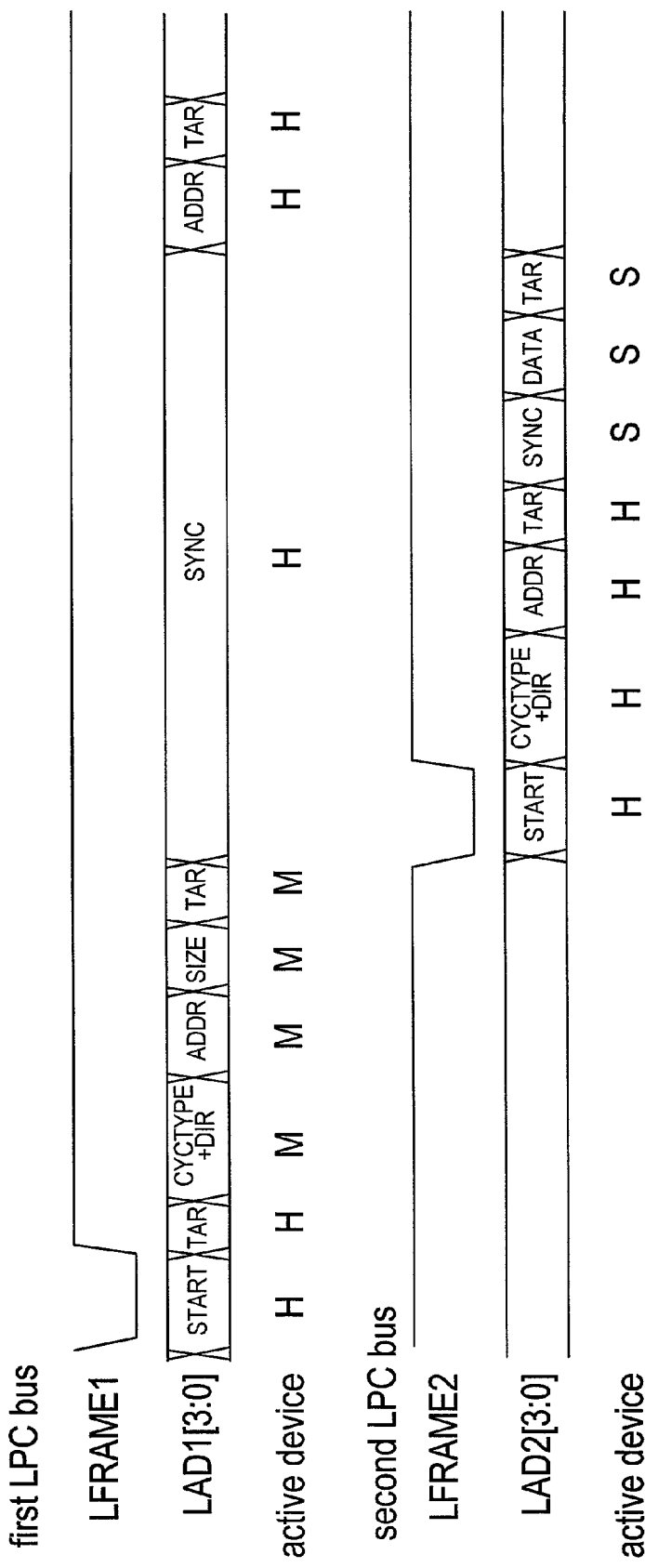
FIG. 4 shows the timing diagram for the read cycles of the master device to read data from the slave device in accordance with the embodiment in FIG. 3 of the present invention.

Please refer to FIG. 4, which shows the timing diagram for the read cycles of the master device to read data from the slave device in accordance with the embodiment in FIG. 3 of the present invention. The timing diagram includes two cycles. At the beginning of the read cycle, a first cycle is started on the first LPC bus through the control line LFRAME1 by the LPC host controller (H). The LPC host controller (H) drives a START value on signal lines LAD1 [3:0], which communicate address, control, and data information over the first LPC bus between a host and a peripheral. Later, the active device is turned around (TAR) to become the master LPC device (M), which then determines the cycle type and the direction (CYCTYPE+DIR) as a read cycle during which the data from the slave device is read. Then the address (ADDR) and the size (SIZE) of the data are determined. Later, the active device is turned around (TAR) again to become the LPC host controller (H), which drives a SYNC signal that is inserted with a plurality of wait states. While the reading request from the master LPC device is received by the LPC host controller, the address of the data to be read is recorded in the address register of the LPC host controller.

Meanwhile, according to the reading request from the master LPC device, a second cycle is started on the second LPC bus through the control line LFRAME2 by the LPC host controller (H). The LPC host controller (H) drives a START value on LAD2[3:0], which communicate address, control, and data information over the second LPC bus between a host and a peripheral, and then determines the cycle type and the direction (CYCTYPE+DIR) as a read cycle during which the data from the slave device is read. Then the address (ADDR) and the size (SIZE) of the data are determined to be the same as those for the reading request transmitted from the master LPC device to the LPC host controller. Later, the active device is turned around (TAR) to become the slave LPC device (S), which drives a SYNC signal and responds the data to be read to the LPC host controller. Then the active device is turned around to become the LPC host controller (TAR), and the cycle on the second LPC bus is terminated.

Figure 5:
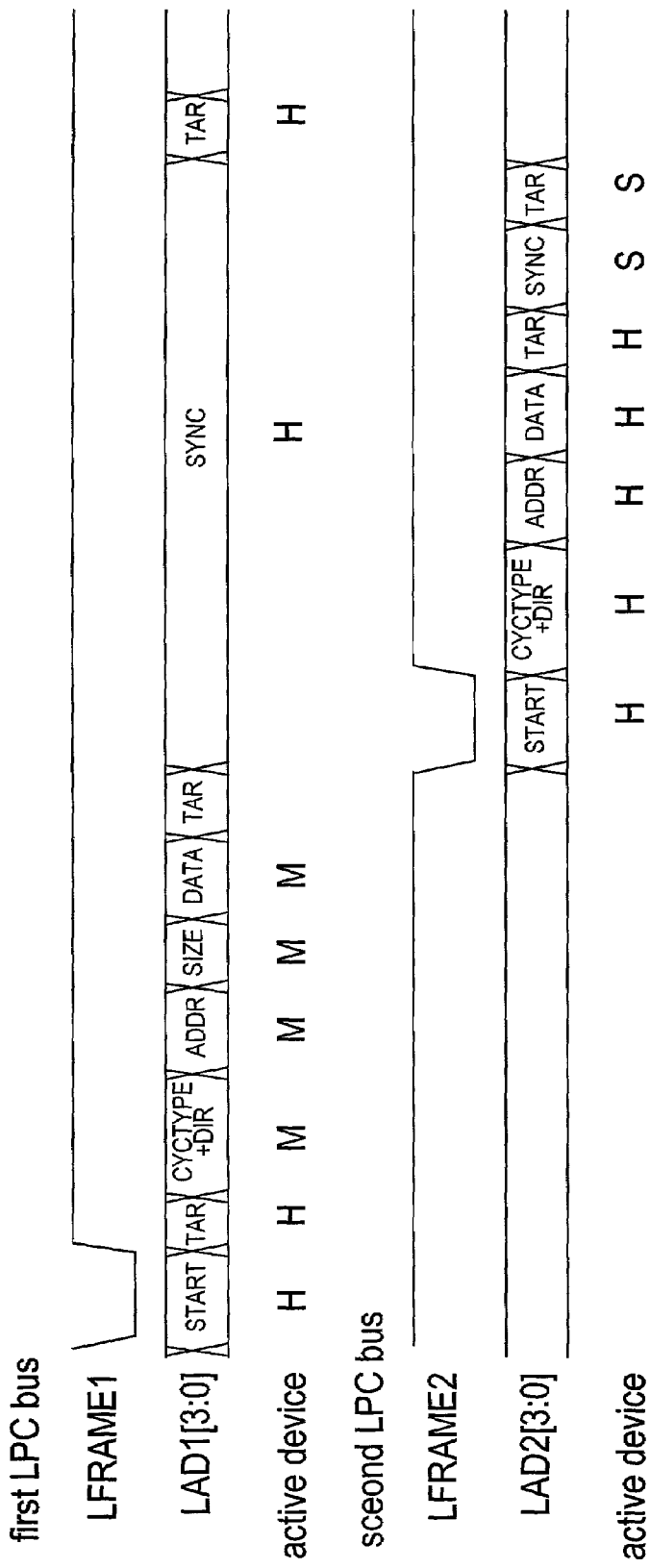
FIG. 5 shows the timing diagram for the write cycles of the master device to write data into the slave device in accordance with the embodiment in FIG. 3 of the present invention.

Meanwhile, the LPC host controller stops inserting the first LPC bus with wait states. Since the address register installed in the LPC host controller records the address of the data requested by the master LPC device, that the LPC host controller can identify the data from the slave LPC device and responds the data to the master LPC device. Then the cycle on the first LPC bus is terminated by an action of turning around and the data is transmitted from the slave LPC device to the master LPC device. On the other hand, as shown in FIG. 5, which shows the timing diagram for the write cycles of the master device to write data into the slave device in accordance with the embodiment in FIG. 3 of the present invention. The timing diagram includes two cycles. At the beginning of the write cycle, a first cycle is started on the first LPC bus through LFRAME1 by the LPC host controller (H). The LPC host controller (H) drives a START value on LAD1[3:0]. Later, the active device is turned around (TAR) to become the master LPC device (M), which then determines the cycle type and the direction (CYCTYPE+DIR) as a write cycle during which the data is written into the slave device. Then the address (ADDR), the size (SIZE) and the data (DATA) are determined. Later, the active device is turned around (TAR) again to become the LPC host controller (H), which drives a SYNC signal that is inserted with a plurality of wait states.

Meanwhile, according to the writing request from the master LPC device, a second cycle is started on the second LPC bus through LFRAME2 by the LPC host controller (H). The LPC host controller (H) drives a START value on LAD2[3:0] and then determines the cycle type and the direction (CYCTYPE+DIR) as a write cycle during which the data is written into the slave device. Then the address (ADDR) and the data (DATA) are determined to be the same as those for the data transmitted from the master LPC device to the LPC host controller. Later, the active device is turned around (TAR) to become the slave LPC device (S), which drives a SYNC signal and complete the action of data writing. Then the active device is turned around (TAR) again to become the LPC host controller, and the cycle on the second LPC bus is terminated.

Meanwhile, the LPC host controller stops inserting the first LPC bus with wait states. The cycle on the first LPC bus is terminated by an action of turning around (TAR) and the data is transmitted from the slave LPC device to the master LPC device.

Accordingly, a plurality of LPC buses can employed to achieve data transmission between LPC devices according to the LPC interface specification.

Figure 6:
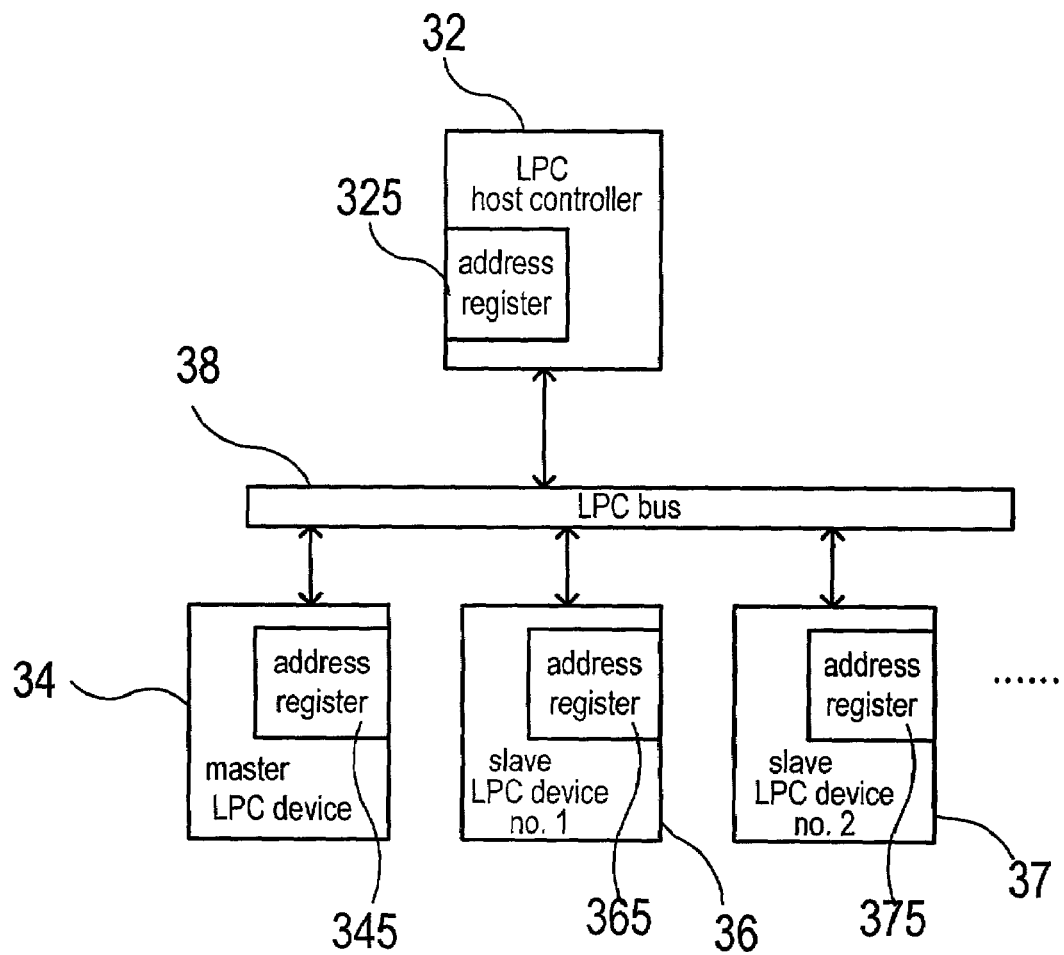
FIG. 6 is a block circuit system diagram showing the LPC circuit system in accordance with another embodiment of the present invention.

Secondly, please refer to FIG. 6, which is a block circuit system diagram showing the LPC circuit system in accordance with another embodiment of the present invention. As shown in the figure, the circuit system configuration comprises: an LPC bus 38; a master device 34 connected to the LPC bus 38; at least one slave LPC devices such as a first slave LPC device 36 and a second slave LPC device 37 connected to the LPC bus 38; and an LPC host controller 32, able to drive the master LPC device 34 and the slave devices 36 and 37 through the LPC bus 38; wherein each of the LPC host controller 32 and the master LPC device 34 comprises an address register 325 and 345.

In the present embodiment, all the LPC devices are connected to a LPC bus. In order to identify the directions for the data transmission, there is an address register installed in each of the LPC host controller and the LPC devices so that data transmission between LPC devices can be achieved in order.

Figure 7:
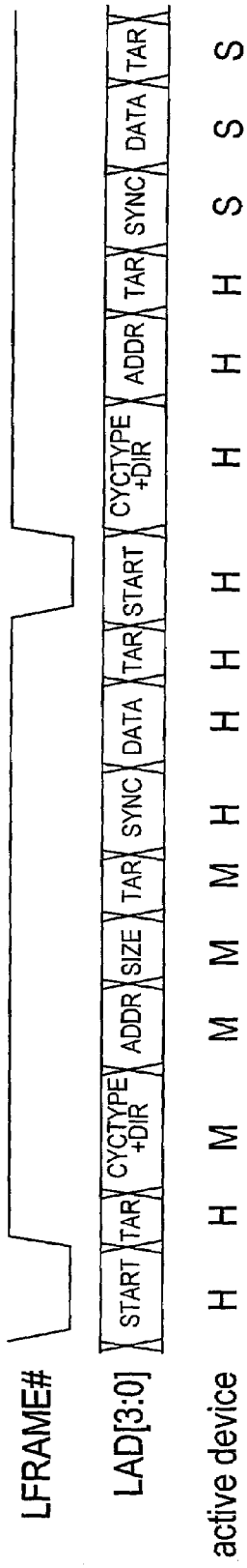
FIG. 7 shows the timing diagram for the read cycles of the master device to read data from the slave device in accordance with the embodiment in FIG. 6 of the present invention.

Please refer to FIG. 7, which shows the timing diagram for the read cycles of the master device to read data from the slave device in accordance with the embodiment in FIG. 6 of the present invention. As shown in the timing diagram, a first cycle is started through the control line LFRAME# by the LPC host controller (H). The LPC host controller (H) drives a START value on signal lines LAD[3:0], which communicate address, control, and data information over the first LPC bus between a host and a peripheral. Later, the active device is turned around (TAR) to become the master LPC device (M), which then determines the cycle type and the direction (CYCTYPE+DIR) as a read cycle during which the data from the first slave device is read. Then the address (ADDR) and the size (SIZE) of the data are determined. Meanwhile, the address of the data is also recorded in the address register of the master LPC device. Later, the active device is turned around (TAR) again to become the LPC host controller (H), which drives a SYNC signal and then terminates the first cycle by an action of turning around (TAR) after responding an arbitrary data (DATA) in response to the reading request from the master LPC device. While the reading request from the master LPC device is received by the LPC host controller, the address of the data to be read is recorded in the address register of the LPC host controller.

According to the LPC interface specification, the LPC host controller must response a data in response to the reading request from the master LPC device; otherwise, malfunction may occur without a proper response. When the LPC host controller cannot response the master LPC device with the data requested, the LPC host controller may respond an arbitrary data. The master LPC device can determine whether the data is the requested one according to the address recorded by the address register.

Meanwhile, according to the reading request from the master LPC device, a second cycle is started through LFRAME# by the LPC host controller (H). The LPC host controller (H) drives a START value on LAD[3:0] and then determines the cycle type and the direction (CYCTYPE+DIR) as a read cycle during which the data from the first slave device is read. Then the address (ADDR) of the data is determined to be the same as that for the data transmitted from the master LPC device to the LPC host controller. Later, the active device is turned around (TAR) to become the first slave LPC device (S), which drives a SYNC signal and responds the data (DATA) to be read to the LPC host controller. Then the active device is turned around (TAR) to become the LPC host controller, and the second cycle is terminate. By monitoring the data transmitted from the slave LPC device through the LPC bus, the master LPC device identifies and obtains the data to be read according to the address of the data recorded in the address register of the master LPC device.

Figure 8:
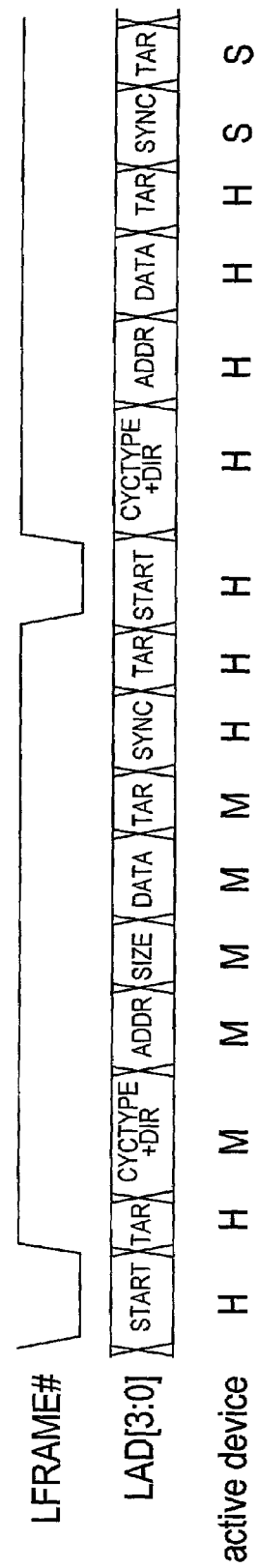
FIG. 8 shows the timing diagram for the write cycles of the master device to write data into the slave device in accordance with the embodiment in FIG. 6 of the present invention.

On the other hand, Please refer to FIG. 8, which shows the timing diagram for the write cycles of the master device to write data into the slave device in accordance with the embodiment in FIG. 6 of the present invention. As shown in the timing diagram, a first cycle is started through LFRAME# by the LPC host controller (H). The LPC host controller (H) drives a START value on LAD[3:0]. Later, the active device is turned around (TAR) to become the master LPC device (M), which then determines the cycle type and the direction (CYCTYPE+DIR) as a write cycle during which the data is written into the first slave device. Then the address (ADDR), the size (SIZE) and the data (DATA) are determined. Later, the active device is turned around (TAR) again to become the LPC host controller (H), which drives a SYNC signal in response to the master LPC device and then terminate the first cycle (TAR).

Meanwhile, according to the writing request from the master LPC device, a second cycle is started through LFRAME# by the LPC host controller (H). The LPC host controller (H) drives a START value on LAD[3:0] and then determines the cycle type and the direction (CYCTYPE+DIR) as a write cycle during which the data is written into the slave device. Then the address (ADDR) and the data (DATA) are determined to be the same as those for the data transmitted from the master LPC device to the LPC host controller. Later, the active device is turned around (TAR) to become the first slave LPC device (S), which drives a SYNC signal in response to the LPC host controller and completes writing the data. Then the active device is turned around (TAR) to become the LPC host controller, and the second cycle Is terminated.

Therefore, the present invention employs two simplified read/write cycles and an address register installed in each of the LPC host controller and the LPC devices so as to achieve data transmission between LPC devices.

According to the above discussion, it is apparent that the present invention discloses a circuit system and a method for data transmission between LPC devices, in which there is an address register installed either in an LPC host controller connected to each LPC device through a respective LPC bus or in each LPC device so that the LPC devices can communicate according to the LPC interface specification. Therefore, the present invention has been examined to be progressive, advantageous and applicable to the industry.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A circuit system for data transmission between LPC devices, comprising:
   a first LPC bus connected to a first LPC device;
   a second LPC bus connected to a second LPC device; and,
   an LPC host controller including an address register for storing a target address, said LPC host controller being operable to initiate concurrently a first bus access cycle on said first LPC bus and a second bus access cycle on said second LPC bus, said LPC host controller being further operable to initiate said second access cycle upon said target address matching an address on said second LPC bus, said LPC host controller being configured to terminate said first bus access cycle only after said second bus access cycle is terminated.

2. The circuit system as recited in claim 1, wherein said first LPC device is a master LPC device and said second LPC device is a slave LPC device.

3. The circuit system as recited in claim 1, wherein said first LPC bus and said second LPC bus are connected to a plurality of LPC devices, respectively.

4. A method for data transmission between LPC devices, comprising the steps of:
   providing an LPC host controller with an address register for storing a target address;
   initiating a first bus access cycle on a first LPC bus by said LPC host controller;
   transmitting over said first LPC bus by a first LPC device coupled thereto a request to said LPC host controller for a transaction with a second LPC device coupled to a second LPC bus;
   storing an address of a data location on said second LPC device in said address register as said target address;
   inserting a plurality of wait states in said first bus access cycle to place said first LPC bus in a wait state after said request is received by said LPC host controller;
   initiating a second bus access cycle on said second LPC bus by said LPC host controller concurrently while said first LPC bus is in said wait state; and,
   accessing by said LPC host controller said data location over said second LPC bus.

5. The method as recited in claim 4 including the steps of:
   setting said transaction to be a data read from said second LPC device;
   transferring said data from said second LPC device to said LPC host controller over said second LPC bus;
   terminating said bus access cycle on said second LPC bus;
   terminating said wait state inserting step after said bus access cycle on said second LPC bus is terminated;
   transferring said data from said LPC host controller to said first LPC device over said first LPC bus; and,
   terminating said bus access cycle on said first LPC bus after said LPC host controller transfers said data to said first LPC device.

6. The method as recited in claim 4 further including the steps of:
   setting said transaction to be a data write to said second LPC device;
   transferring said data from said first LPC device to said LPC host controller over said first LPC bus;
   transferring said data from said LPC host controller to said first LPC device over said second LPC bus; and,
   terminating said bus access cycle on said second LPC bus;
   terminating said wait state inserting step after said bus access cycle on said second LPC bus is terminated;
   terminating said bus access cycle on said first LPC bus after said LPC host controller transfers said data to said second LPC device.

7. A circuit system for data transmission between LPC devices, comprising:
   an LPC bus;
   a master LPC device connected to said LPC bus, said master LPC device including an address register operable to persistently store a target address;
   at least one slave LPC device connected to said LPC bus; and
   an LPC host controller including an address register operable to persistently store said target address, said LPC host controller being operable to initiate a data transfer cycle on said LPC bus, said data transfer cycle being a concatenation of a first bus access cycle for LPC bus access by said master LPC device and a second bus access cycle for LPC bus access by one of said at least one slave LPC device.

8. The circuit system as recited in claim 7, wherein each of said at least one slave LPC device includes an address register for storing said target address.

9. A method for data transmission between LPC devices, comprising the steps of:
   providing an LPC master device with an address register operable to store a target address persistently over at least two bus access cycles on an LPC bus;
   initiating a first bus access cycle on said LPC bus by said LPC host controller;
   transmitting a request for a transaction over said LPC bus from said master LPC device to said LPC host controller, said transaction specifying a transfer of first data between said master LPC device and a slave LPC device;
   transferring second data between said LPC host controller and master LPC device during said first bus access cycle;
   storing an address of a data location on said slave LPC device in said address register of said master LPC device as said target address;
   initiating a second bus access cycle on said LPC bus by said LPC host controller;
   transferring said first data between said LPC host controller and said slave LPC device during said second bus access cycle.

10. The method as recited in claim 9 further including the steps of:
    setting said transaction to be a data read from said slave LPC device; and,
    setting said second data to an arbitrary data value.

11. The method as recited in claim 10, further comprising the steps of:
    providing said LPC host controller with an address register operable to persistently store said target address; and,
    storing said address of said data location in said address register of said LPC host controller after said LPC host controller has received said transaction request from said master LPC device.

12. The method as recited in claim 11, further comprising the steps of:
    transferring said first data from said slave LPC device to said LPC host controller; and monitoring said LPC bus at said master LPC device for data transferred from said slave LPC device; and, accepting at said master LPC device said data transferred from said at least one slave LPC device as said first data if a source address thereof is equivalent to said target address stored in said address register of said master LPC device.

13. The method as recited in claim 9 further including the steps of:

setting said transaction to be a data write to said slave LPC device; and, setting said second data to equal said first data.

* * * * *